Patented Oct. 2, 1934

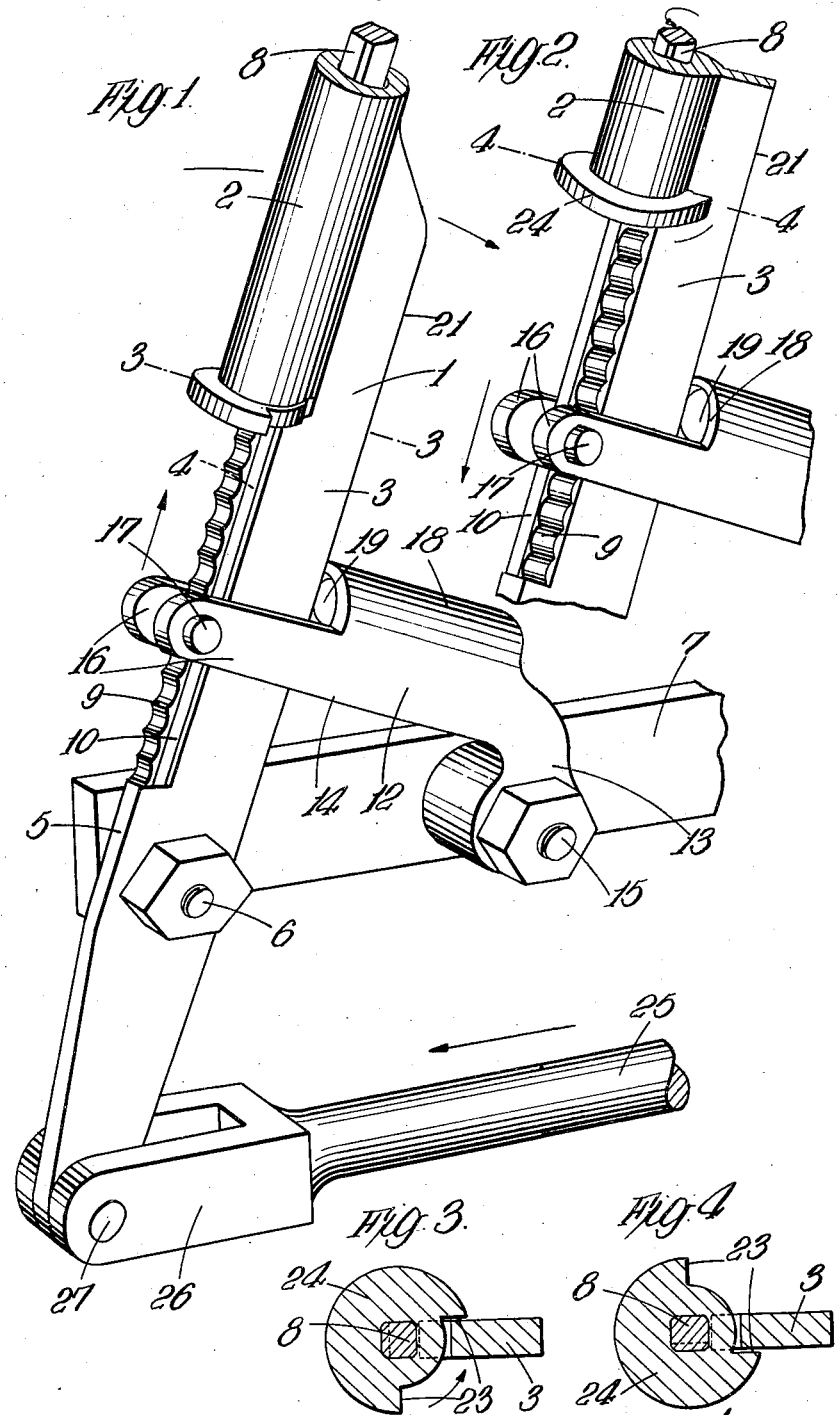

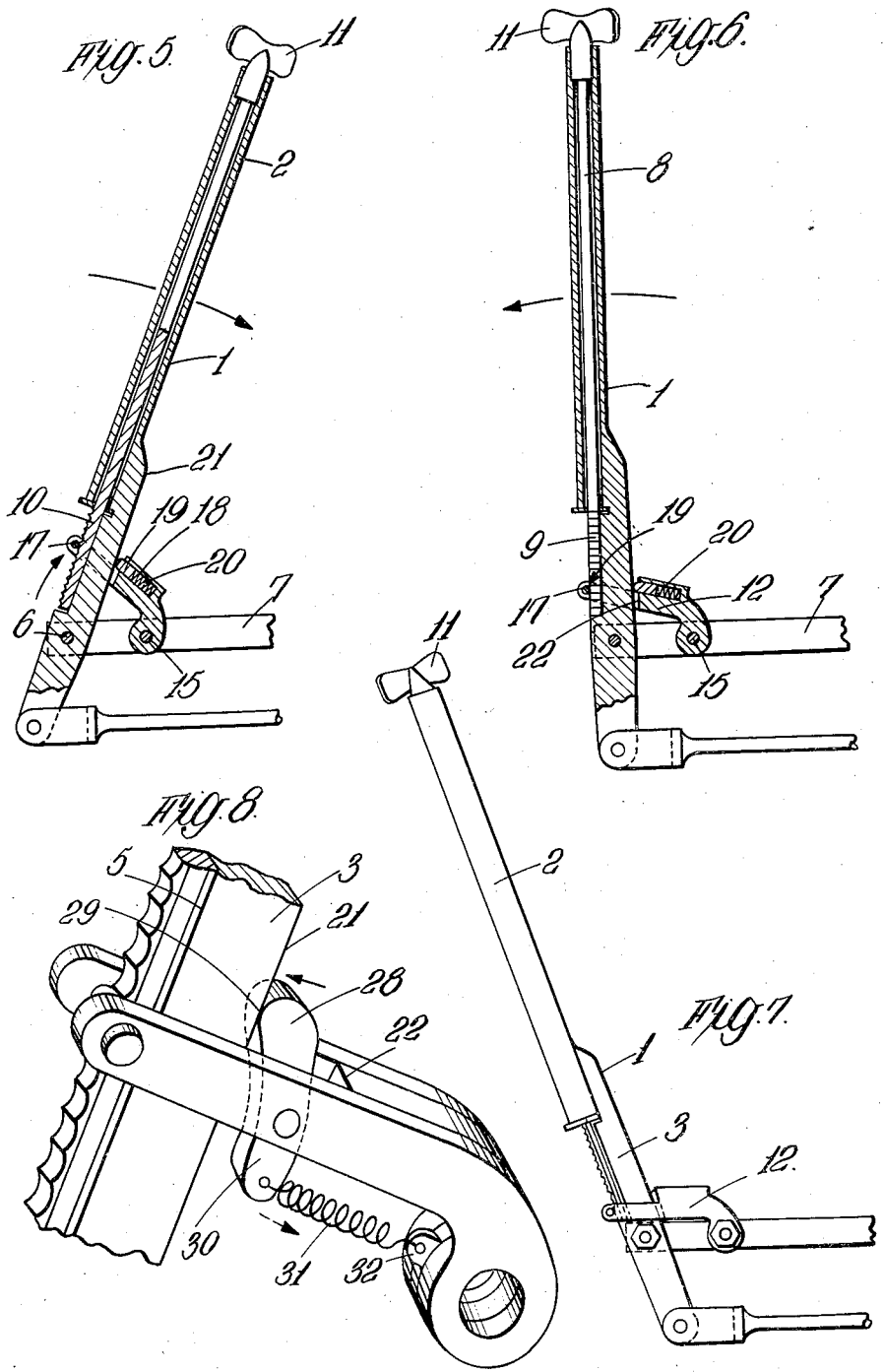

1,975,492

UNITED STATES PATENT OFFICE 1,975,492

AUTOMOBILE HAND BRAKE AND OTHER LEVER

John Henry Wyndham, Godalming, England

Application August 25, 1933, Serial No. 686,694
In Great Britain June 7, 1933

3 Claims. (Cl. 74—39)

This invention relates to operating levers primarily intended for use as automobile handbrake levers, which are locked in a set position according to requirement by a rack and pawl mechanism.

An object of the present invention is to provide an operating lever which is firmly retained in locked position and is readily releasable from such position.

The operating lever according to this invention is provided with a longitudinal rack element forwardly exposed and a pawl lever mounted on a pivot located rearwardly of the operating lever and co-acting with said rack element to lock the operating lever in a set position, said rack element and pawl lever being relatively displaceable to free the operating lever, the relative displacement preferably being obtained by providing a rack element rotatable about its longitudinal axis and which is adapted to be rotated to disengage the pawl lever therefrom and thereby free the operating lever.

The rack element rotatable about its longitudinal axis is preferably located along or adjacent the front edge of the operating lever, and the pawl lever is preferably provided with a spring pressed member conveniently in the form of a plunger, with which the operating lever co-acts to displace the pawl lever about its pivot to ride up the rack element.

The pawl lever is preferably forked at its front end, the two forked portions extending on either side of and beyond the front edge of the operating lever. A catch element co-acting with the rack element is secured to and extends transversely between the front ends of said forked portions. The said catch element is preferably of circular or arcuate contour on the surface engaging the rack element, the teeth of which are complementally formed to co-act with the catch element.

The invention is illustrated in the accompanying drawings as applied to an operating lever suitable for use as an automobile hand-brake lever. In the drawings:—

Fig. 1 is a perspective view of the operating lever in an operative position;

Fig. 2 is a perspective view of a portion of the operating lever, the pawl lever and the rack element in its release position;

Figs. 3 and 4 are sectional views on the lines 3—3 and 4—4 of Figs. 1 and 2 respectively, and show positions of a stop washer with the rack element in its operative and inoperative positions;

Fig. 5 is a sectional side elevation of the operating lever in operative position;

Fig. 6 is a similar view to Fig. 5 with the lever partially released;

Fig. 7 is a side elevation showing the operating lever fully released, and

Fig. 8 is a similar view to Fig. 2 of a modified form or device employing a spring pressed cam lever.

Referring to the drawings, the operating lever 1 may be formed with a tubular upper portion 2, a flat rectangular sectioned lower portion 3 with a recess 4 in its front edge 5 extending from the bottom of the upper tubular portion and in line therewith to a point adjacent to and above the main pivot 6 of the operating lever. The operating lever is pivoted to a suitable support 7 secured to or forming part of the automobile chassis, by means of the pivot pin 6 secured to the support. A rod 8 constituting a rack element and rotatably mounted within the upper tubular portion 2 of the operating lever is provided with a rack 9 on one face of a rectangular lower portion 10, which portion extends in and along the recess 4 in the front edge of the operating lever. Suitable bushings may be provided in the upper tubular portion for rotatably mounting the rack therein. A winged or other suitable operating member 11 is secured to the upper end of the said rod, the said member having two diametrically opposed wings.

As previously stated, the rotatable rack co-acts with a pawl lever mounted on a pivot at the rear of the operating lever; this pivot may be located on the support to which the operating lever is pivoted. The pawl lever 12 is conveniently cranked downwardly at its pivot end 13 substantially at right angles to the remaining length 14, hereinafter termed the horizontal portion thereof, the pivot 15 being located at the lower extremity of the cranked portion. The horizontal portion of the pawl lever is forked at its front end and the arms of the fork 16 extend on each side of the operating lever to a point in front of the rack located on its front edge. A catch element 17 preferably constituted by a circular sectioned pin, extends between and is secured to the extremities of the fork so as to co-act with the rack teeth, which teeth are complementally formed to co-act with the surface of the element 1 engaging therewith.

A tubular housing 18 is provided on the upper edge of the horizontal or rear portion of the pawl lever 12. Slidable within this housing is a plunger 19 pressed by a spring 20 into contact with the rear edge 21 of the operating lever. The movement of the plunger and the position of the rear 22 of the fork portion of the pawl lever are such that when the operating lever is displaced the pawl lever will be capable of travelling over the full length of the rack.

Stops are preferably provided to position the rotatable rack element at the limits of its operative and inoperative positions. Such stops are conveniently constituted by faces 23 on a peripherical recess in a disc 24 secured on the rack element, the said faces engaging with the side surfaces of the operating lever.

To facilitate the return of the locked operating lever to its full released position, the rear edge of the operating lever engaging the spring pressed plunger may be tapered towards the lower end of the operating lever, so as to relieve the pressure contact with the said plunger.

The lower end 3 of the operating lever is extended below its pivot and is provided with any convenient means for connection with the mechanism to be operated. In the embodiment shown, this mechanism is connected by means of a rod 25 having a forked end 26 which is secured to the operating lever by a pin 27.

In place of the spring pressed plunger 17, a spring pressed cam lever may be employed as shown in Fig. 8. The fork in the pawl lever is extended rearwardly and the cam lever 28 is pivotally mounted between the two forked members in the plane of the operating lever. The cam lever which extends above and below the fork arms is provided with a cam surface 29 at its upper end which extends outwardly from the front of the lever to co-act with the rear edge of the operating lever. The lower portion 30 of the cam lever which extends downwardly and rearwardly is attached to one end of a tension spring 31, the other end of such spring being conveniently secured to a lug or hook 32 on or adjacent the extremity of the cranked portion of the pawl lever.

The arrangement of the several parts of the device is such that at the normal or fully released position of the operating lever the outer extremity of the pawl lever is at the bottom of the rack as shown in Fig. 7, and when the operating lever is pulled rearwardly, the rack being in operative position as shown in Figs. 5 and 7, the rear edge of the operating lever engages the plunger 9 and displacing the pawl lever about its pivot causes the catch element 17 on the pawl lever to ride up and engage the teeth on the rack, a turning moment being set up about the pivot of the pawl lever. When it is desired to release the operating lever, the rotatable rack is rotated by means of the winged or other suitable operating member on its upper end so as to disengage the rack teeth from the catch element on the pawl lever as shown in Figs. 2 and 6. If desired, the operating lever may be manually retained in operatve position and in which case the rack is positioned in its inoperative position. Further, if after manually retaining the operating lever in its operating position it is desired to lock it in such position, the rack is rotated by means of the operating member to engage the catch on the pawl lever.

A secure locking action is obtained with an operating lever constructed in accordance with this invention, as the reaction between the rack and the catch member of the pawl lever is substantially normal to the longitudinal axis of the rack.

I claim:—

1. A device of the character described comprising a pivoted operating lever, a rod rotatably borne by said lever and having exposed rack teeth, a pawl lever pivotally mounted rearwardly of said operating lever and co-acting with said rack teeth to lock said operating lever in set position and means for rotating said rack teeth to disengage the pawl lever therefrom.

2. A device of the character described comprising a pivoted operating lever, a rod rotatably borne by said lever and having exposed rack teeth, a pawl lever pivotally mounted rearwardly of said operating lever, a catch element carried by said pawl lever adapted to engage said rack teeth to lock said operating lever in set position, a spring-pressed member carried by said pawl lever and co-acting with said operating lever to displace said pawl lever about its pivot to ride up said rack element and means associated with said rod to rotate said rack teeth to disengage the pawl lever therefrom.

3. A device of the character described comprising a pivoted operating lever, a rod rotatably borne by said lever and having exposed rack teeth, a pawl lever pivotally mounted rearwardly of said operating lever and co-acting with said rack teeth to lock said operating lever in set position, means for rotating said rack teeth to disengage the pawl lever therefrom and stops borne by said rod to position its rack teeth in operative and inoperative positions.

JOHN HENRY WYNDHAM. [L. S.]